United States Patent
Wang et al.

(10) Patent No.: US 9,430,058 B2
(45) Date of Patent: Aug. 30, 2016

(54) TOUCH STYLUS CAPABLE OF DETECTING PRESSURE ON A TIP AND RELATED OPTICAL-MECHANICAL SYSTEM

(71) Applicant: Wistron Corporation, New Taipei (TW)

(72) Inventors: Kuo-Hsing Wang, New Taipei (TW);
Pei-Chen Chin, New Taipei (TW);
Pin-Hsien Su, New Taipei (TW);
Wen-Chin Wu, New Taipei (TW);
Yi-Sheng Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 272 days.

(21) Appl. No.: 13/661,054

(22) Filed: Oct. 26, 2012

(65) Prior Publication Data

US 2013/0257812 A1    Oct. 3, 2013

(30) Foreign Application Priority Data

Mar. 28, 2012   (TW) .............................. 101110760 A (51) Int. Cl.
*G06F 3/042* (2006.01)
*G06F 3/0354* (2013.01)
(Continued)

(52) U.S. Cl.
CPC ............. *G06F 3/0354* (2013.01); *G06F 3/043* (2013.01); *G06F 3/03545* (2013.01); *G06F 3/042* (2013.01); *G06F 3/0414* (2013.01)

(58) Field of Classification Search
CPC .... G06F 3/041; G06F 3/042; G06F 3/03542; G06F 3/0386
USPC .......................................... 345/173, 175, 179
See application file for complete search history.

(56) References Cited

U.S. PATENT DOCUMENTS 5,206,785 A * 4/1993 Hukashima ................ 361/283.2
5,502,568 A * 3/1996 Ogawa et al. ................ 356/620
(Continued)

FOREIGN PATENT DOCUMENTS

JP          H0981297 A      3/1997
WO   WO2011091752 A1 *   8/2011    ............. G06F 3/033

OTHER PUBLICATIONS

Office action mailed on May 30, 2014 for the Taiwan application No. 101110760, filing date: Mar. 28, 2012, p. 1 line 10~14, p. 2~3 and p. 4 line 1~24.
(Continued)

*Primary Examiner* — Chanh Nguyen
*Assistant Examiner* — Yuzhen Shen
(74) *Attorney, Agent, or Firm* — Winston Hsu; Scott Margo (57) ABSTRACT

A touch stylus capable of detecting pressure on its tip is disclosed in the present disclosure. The touch stylus includes a body, a tip, and a pressure sensing module disposed between the body and the tip for detecting a pressure on the tip. The pressure sensing module includes a lighting unit, a pressure sensing unit connected to the tip, and a controller electrically connected to the lighting unit and the pressure sensing unit. The pressure sensing unit detects a movement of the tip relative to the body, and generates a corresponding electrical signal. The controller receives the electrical signal to drive the lighting unit for generating a corresponding optical signal. A scintillating frequency of the optical signal and a value of the electrical signal are in direct proportion, and an optical detector can transform the optical signal into the pressure on the tip.

14 Claims, 5 Drawing Sheets

(51) Int. Cl.
*G06F 3/043* (2006.01)
*G06F 3/041* (2006.01)

(56) References Cited

U.S. PATENT DOCUMENTS

| | | | |
|---|---|---|---|
| 5,565,632 A | 10/1996 | Ogawa | |
| 5,571,997 A * | 11/1996 | Gray et al. | 178/19.04 |
| 5,977,959 A | 11/1999 | Katsurahira | |
| 6,441,362 B1 | 8/2002 | Ogawa | |
| 6,556,149 B1 * | 4/2003 | Reimer et al. | 341/20 |
| 7,528,825 B2 * | 5/2009 | Sakurai et al. | 345/179 |
| 7,696,444 B2 * | 4/2010 | Liu et al. | 178/19.03 |
| 8,536,471 B2 * | 9/2013 | Stern et al. | 178/19.04 |
| 2010/0053120 A1 | 3/2010 | Chang | |

OTHER PUBLICATIONS

Office action mailed on Sep. 1, 2015 for the China application No. 201210108993.5, p. 3 line 4~43, p. 4~8 and p. 9 line 1~13.

* cited by examiner

TOUCH STYLUS CAPABLE OF DETECTING PRESSURE ON A TIP AND RELATED OPTICAL-MECHANICAL SYSTEM

BACKGROUND OF THE INVENTION

1. Field of the Invention

The present disclosure relates to a touch stylus and a related optical-mechanical system, and more particularly, to a touch stylus capable of detecting pressure on its tip and a related optical-mechanical system.

2. Description of the Prior Art

Currently, in the market of various kinds of consumer electronic products, touch panels have been widely applied in portable electronic devices, such as personal digital assistants (PDA), mobile phones, and notebooks for serving as the interface of information communication tool between the users and the electronic devices. Since modern electronic products increasingly become smaller, thinner, and lighter, the display with a touch panel has gradually become the key component of various electronic products in order to save space and to replace conventional input apparatuses, such as keyboard and mouse, leaning on the trend of requirement of human-based designed flat computer.

For example, the portable electronic device has advantages of thin volume and large dimension screen for displaying the information, so the touch panel is usually utilized to be human-machine interface between the users and the portable electronic device. The touch panel can display patterns and characters, and further can be a touch input module. When the user presses the touch panel, the touch panel can detect a position of pressure, and output a control command according to the pressure position on a surface of the touch panel, so as to control the application program installed in the portable electronic device.

A conventional touch stylus includes a capacitive touch stylus and an electromagnetic touch stylus. The electromagnetic touch stylus includes an antenna to receive an electromagnetic signal, has drawbacks of inconvenient operation and expensive manufacturing cost. An electromagnetic coil is disposed inside a body of the electromagnetic touch stylus. When a tip of the touch stylus is pressed, the tip moves relative to the body, and a movement of the tip drives the electromagnetic coil to generate magnetic flux variation, so the electromagnetic touch stylus calculates the pressure on the tip according to the magnetic flux variation. Besides, the electromagnetic touch stylus can further obtain the pressure on the tip according to variation of capacitance value by compression. The capacitive touch stylus does not include an additional receiver, and is utilized to paint a writing track without recording the pressure variation. The tip of the capacitive touch stylus is huge, such as 5-6 mm, for accommodating capacitors and related components. The capacitive touch stylus is inconveniently to be held.

The conventional touch stylus further includes an optical touch stylus. The conventional optical touch stylus can not record pressure variation of the tip. The latest type optical touch stylus detects luminous flux to show the pressure variation of the tip, and has a drawback that detection is interfered easily by ambient light. An integration of the electromagnetic touch stylus, the capacitive touch stylus and the optical touch stylus can design a touch stylus has pressure detection function. Mechanical design and circuit design of the integration touch stylus is complicated that results in expensive manufacturing cost. Therefore, design of a low cost touch stylus without specific receiver for detecting pressure on the tip is an important issue in the computer industry.

SUMMARY OF THE INVENTION

The present disclosure provides a touch stylus capable of detecting pressure on its tip and a related optical-mechanical system for solving above drawbacks.

According to the claimed disclosure, a touch stylus capable of detecting pressure on its tip is disclosed. The touch stylus includes a body, a tip and a pressure sensing module. The tip is movably disposed on an end of the body. The pressure sensing module is disposed between the body and the tip for detecting the pressure on the tip. The pressure sensing module includes a lighting unit, a pressure sensing unit and a controller. The pressure sensing unit is connected to the tip for detecting a movement of the tip relative to the body, so as to generate a corresponding electrical signal. The controller is electrically connected to the lighting unit and the pressure sensing unit for receiving the electrical signal, so as to drive the lighting unit to generate a corresponding optical signal. A scintillating frequency of the optical signal and a value of the electrical signal are in direct proportion. The optical signal is transmitted to an optical detector disposed on a panel, and the optical detector transforms the scintillating frequency of the optical signal into the pressure on the tip.

According to the claimed disclosure, the lighting unit is an infrared light emitting diode.

According to the claimed disclosure, the pressure sensing unit is an optical detection set. The optical detection set includes an optical emitter, an optical receiver and a retractable isolation structure.

According to the claimed disclosure, the optical emitter and the optical receiver are respectively disposed on two ends of the retractable isolation structure.

According to the claimed disclosure, the optical receiver receives a light intensity signal emitted from the optical emitter, and transforms the light intensity signal into the electrical signal corresponding to the movement.

According to the claimed disclosure, the pressure sensing unit is a sonic detection set. The sonic detection set includes a sonic emitter, a sonic receiver, a compressive component and a retractable isolation structure. The sonic emitter and the sonic receiver are respectively disposed on two ends of the retractable isolation structure, and the compressive component is disposed inside the retractable isolation structure. The sonic receiver receives a sound intensity signal emitted from the sonic emitter, and transforms the sound intensity signal into the electrical signal corresponding to the movement.

According to the claimed disclosure, the pressure sensing unit is a medium pressure detection set. The medium pressure detection set includes a manometer and a retractable airtight structure. The manometer is disposed on a side of the retractable airtight structure. The manometer receives a pressure variation of the medium disposed inside the retractable airtight structure, and transforms the pressure variation into the electrical signal corresponding to the movement.

According to the claimed disclosure, the medium is gas or liquid.

According to the claimed disclosure, the pressure sensing unit is a piezoelectric component, an electric induction component or a magnetic induction component.

According to the claimed disclosure, the scintillating frequency of the optical signal and the pressure on the tip are in direct proportion.

According to the claimed disclosure, an optical-mechanical system utilizing a touch stylus to detect pressure on its tip is disclosed. The optical-mechanical system includes a panel, at least one optical detector and a touch stylus. The optical detector is disposed on a corner of the panel. The touch stylus is for painting a line on the panel. The optical detector detects parameters generated by the touch stylus to display a pattern on the panel. The pattern corresponds to a track of the line and the pressure on its tip. The touch stylus includes a body, a tip and a pressure sensing module. The tip is movably disposed on an end of the body. The pressure sensing module is disposed between the body and the tip for detecting the pressure on the tip. The pressure sensing module includes a lighting unit, a pressure sensing unit and a controller. The pressure sensing unit is connected to the tip for detecting a movement of the tip relative to the body, so as to generate a corresponding electrical signal. The controller is electrically connected to the lighting unit and the pressure sensing unit for receiving the electrical signal, so as to drive the lighting unit to generate a corresponding optical signal. A scintillating frequency of the optical signal and a value of the electrical signal are in direct proportion. The optical signal is transmitted to an optical detector disposed on a panel, and the optical detector transforms the scintillating frequency of the optical signal into the pressure on the tip.

According to the claimed disclosure, the optical detector further analyzes code information or linear information modulated in the scintillating frequency of the optical signal.

According to the claimed disclosure, an image capturing frequency of the optical detector is divided into a plurality of intervals, the optical detector reads the scintillating frequency of the optical signal during each frequency interval in sequence, and transforms the scintillating frequency of the optical signal into the pressure on the tip.

The optical-mechanical system of the present disclosure can simultaneously detect the moving track of the touch stylus and the pressure on the tip, so as to display the line with the corresponding width variation on the panel. The optical-mechanical system transmits the value of the pressure on the tip via the scintillating frequency of the optical signal. The pressure on the tip corresponds to the width variation of the line painted on the panel. Besides, the scintillating frequency of the optical signal can include the code information or the linear information for triggering the shortcut button by specific clicks of the touch stylus. The present disclosure has advantages of simple structure and low assembly cost, and the touch stylus with the lighting unit can be applied to many kinds of the optical touch module for performing the painting line with the width variation, so that the product of the present disclosure has preferable market competition.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
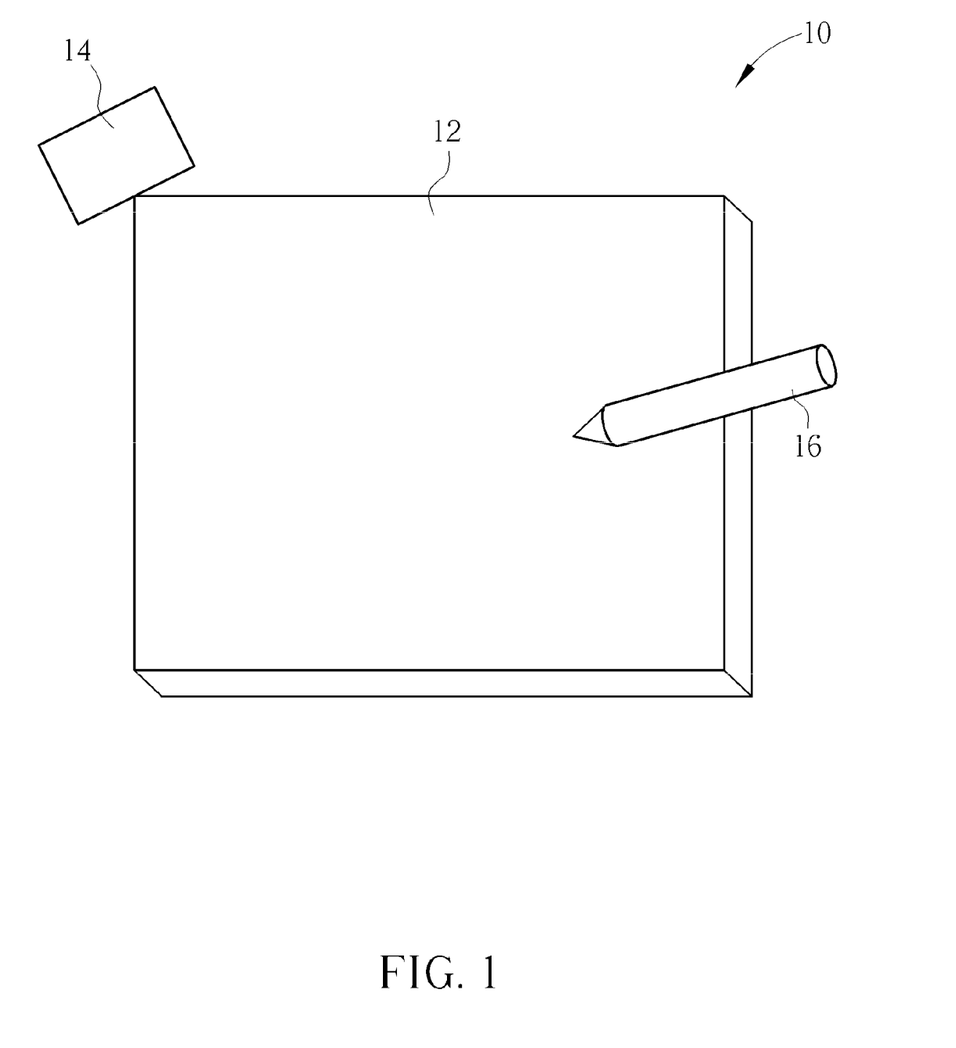
FIG. 1 is a diagram of an optical-mechanical system according to an embodiment of the present disclosure.

Please refer to FIG. 1. FIG. 1 is a diagram of an optical-mechanical system 10 according to an embodiment of the present disclosure. The optical-mechanical system 10 includes a panel 12, at least one optical detector 14 and a touch stylus 16. The optical detector 14 is disposed on a corner of the panel 12 for detecting a track and a pressure of the touch stylus 16 when moving on a surface of the panel 12. The touch stylus 16 can be used to paint a line on the surface of the panel 12, the panel 12 does not have touch detection function, and the optical-mechanical system 10 utilizes the optical detector 14 to detect the line track of the touch stylus 16. Thus, the optical-mechanical system 10 of the present disclosure can detect the track and the pressure of the line when the user paints the line by the touch stylus 16, so as to display detailed parameters of the line, such as a thickness, a direction and so on, on the panel 12.

It should be mentioned that the optical-mechanical system 10 of the present disclosure can include a plurality of optical detectors 14, or can further include the optical detectors 14 and related reflection bars disposed on edges of the panel 12. For example, the optical-mechanical system 10 can include two optical detectors 14 respectively disposed on two ends of the same edge of the panel 12, or can further include two optical detectors 14 and one reflection bar that the optical detectors 14 are respectively disposed on two ends of the same edge of the panel 12 and the reflection bar is disposed on the opposite edge corresponding to the optical detectors 14, or can further include three optical detectors 14 respectively disposed on two ends and a middle area of the same edge of the panel 12, or can further include four optical detectors 14 respectively disposed on four corners of the panel 12, or can further include six optical detectors 14 respectively disposed on the two ends and the middle area of two opposite edges of the panel 12. Applications of the optical-mechanical system 10 are not limited to the above-mentioned embodiments, and depend on design demand.

Figure 2:
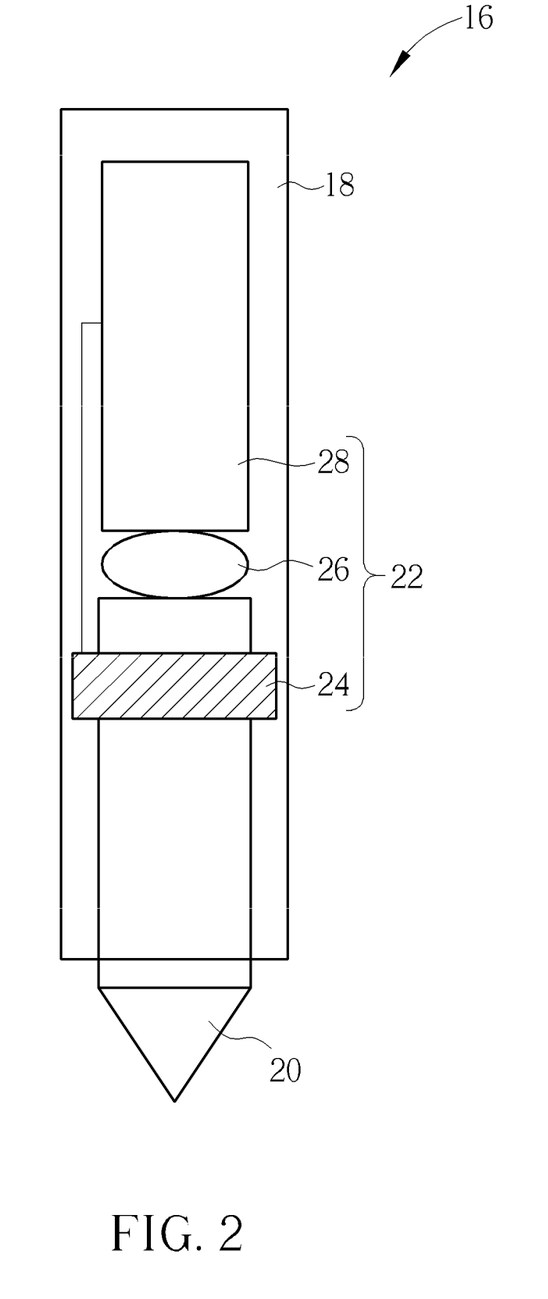
FIG. 2 is a diagram of a touch stylus according to the embodiment of the present disclosure.

Please refer to FIG. 2. FIG. 2 is a diagram of the touch stylus 16 according to the embodiment of the present disclosure. The touch stylus 16 includes a body 18, a tip 20 and a pressure sensing module 22. The user can hold the touch stylus 16 via the body 18. The tip 20 can be movably disposed on an end of the body 18. When the touch stylus 16 is operated to paint the line, the tip 20 can move relative to the body 18 according to applying force on the touch stylus 16 by the user. For example, a large part of the tip 20 protrudes from the body 18 when the applying force is slight, and the tip 20 is mostly inserted into the body 18 when the applying force is strenuously. It is to say, a movement of the tip 20 relative to the body 18 and the applying force from the user are in direct proportion, which means the movement of the tip 20 relative to the body 18 and pressure on the tip 20 are in direct proportion. The pressure sensing module 22 can be disposed between the body 18 and the tip 20. The pressure sensing module 22 can detect the movement of the tip 20 relative to the body 18, and transform the movement into the pressure value on the tip 20 by the other electronic components.

As shown in FIG. 2, the pressure sensing module 22 includes a lighting unit 24, a pressure sensing unit 26 and a controller 28. The lighting unit 24 can be a light emitting diode (LED) preferably, which had advantages of power economy and heat dissipation. The pressure sensing unit 26 is connected to the tip 20, and can move relative to the body 18 with the tip 20. The pressure sensing unit 26 can detect the movement of the tip 20 relative to the body 18. The pressure sensing unit 26 can be a piezoelectric component, which can generate a corresponding electrical signal according to the movement of the pushed tip 20. The pressure sensing unit 26 can further be an air pressure gauge or a liquid pressure gauge, which can generate the corresponding electrical signal according to medium pressure variation when the tip 20 moves relative to the body 18. The pressure sensing unit 26 can further be an electric induction component or a magnetic induction component, which can actuate electric flux variation or magnetic flux variation according to the pressure on the tip 20 when moving relative to the body 18, so as to generate the corresponding electrical signal. Applications of the pressure sensing unit 26 are not limited to the above-mentioned embodiments, and depend on actual demand.

In addition, the controller 28 is electrically connected to the lighting unit 24 and the pressure sensing unit 26. When the pressure sensing unit 26 detects the pressure variation on the tip 20 by the movement relative to the body 18, the pressure sensing unit 26 can output the corresponding electric signal to the controller 28. In the embodiment of the present disclosure, a value of the electrical signal, such as a voltage, and the movement of the tip 20 relative to the body 18 are in the direct proportion. The controller 28 can drive the lighting unit 24 to emit a corresponding optical signal according to the value of the electric signal. A scintillating frequency of the optical signal and the value of the electrical signal are in the direct proportion, so that the optical detector 14 can transform the scintillating frequency of the optical signal into the pressure on the tip 20 accordingly after receiving the optical signal, so as to show the line with the detailed parameters, such as the track and width variation, on the panel 12.

The movement of the tip 20 relative to the body 18, the scintillating frequency of the optical signal and the pressure on the tip 20 are in the direct proportion. When the user presses the touch stylus 16 to paint the line with great exertion, the scintillating frequency of the optical signal is fast. When the user utilizes the touch stylus 16 to paint the line slightly, the scintillating frequency of the optical signal from the lighting unit 24 becomes slow. Therefore, the optical-mechanical system 10 of the present disclosure can effectively utilize the optical detector 14 to detect the applying force on the touch stylus 16, and simultaneously show the corresponding detailed parameters of the line on the panel 12.

Applications of the pressure sensing module 22 of the present disclosure are introduced as following paragraph. The pressure sensing unit 26 of the pressure sensing module 22 can be an optical detection set 30, a sonic detection set 32 or a medium pressure detection set 34. Selection of the pressure sensing unit 26 depends on design demand, and detailed description is omitted herein for simplicity.

Figure 3:
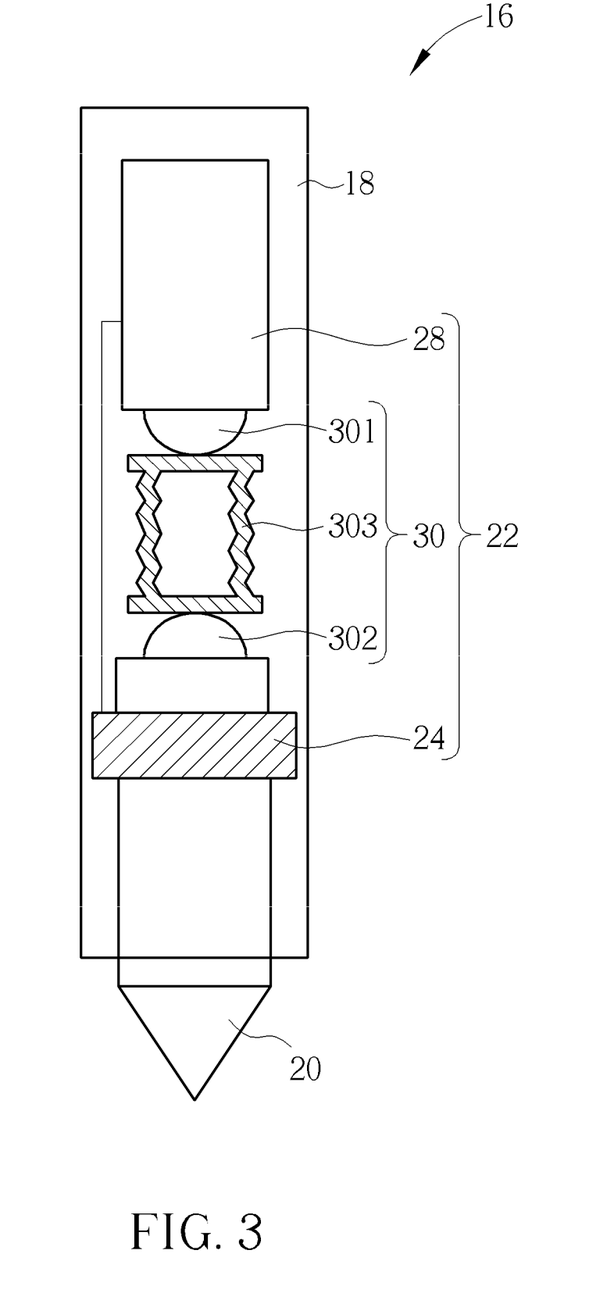
FIG. 3 is a diagram of the touch stylus with an optical detection set according to a first embodiment of the present disclosure.

Please refer to FIG. 3. FIG. 3 is a diagram of the touch stylus 16 with the optical detection set 30 according to a first embodiment of the present disclosure. The optical detection set 30 (the pressure sensing unit 26) can include an optical emitter 301, an optical receiver 302 and a retractable isolation structure 303. The optical emitter 301 and the optical receiver 302 can be respectively disposed on two ends of the retractable isolation structure 303. When the tip 20 is forced to move relative to the body 18, the optical detection set 30 is actuated to drive the optical emitter 301 to emit a light intensity signal. A vertical dimension of the retractable isolation structure 303 can be changed according to the movement of the tip 20 relative to the body 18. The optical receiver 302 can detect the movement of the tip 20 relative to the body 18 according to time difference between receiving the light intensity signal by the optical receiver 302 and outputting the light intensity signal by the optical emitter 301, then the optical detection set 30 can generate the electric signal corresponding to the movement, and the controller 28 can read value of the electric signal to drive the lighting unit 24 to emit the optical signal with the related scintillating frequency. The retractable isolation structure 303 can prevent ambient light from transmitting inward for isolating environmental interference.

Figure 4:
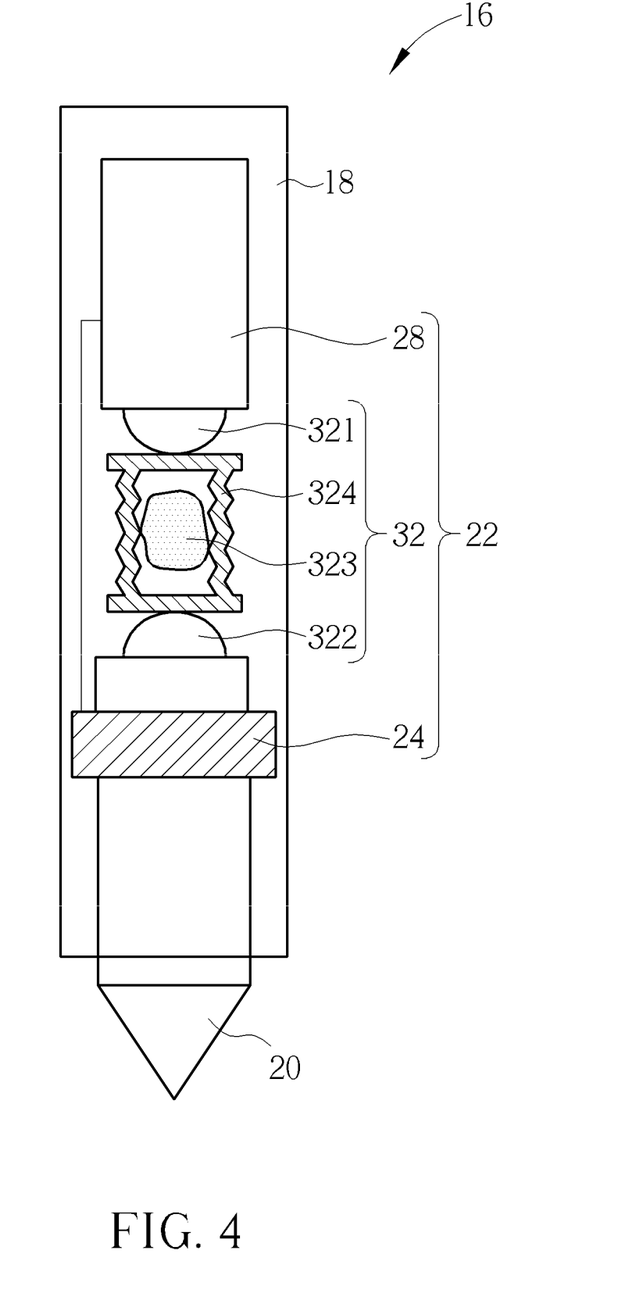
FIG. 4 is a diagram of the touch stylus with a sonic detection set according to a second embodiment of the present disclosure.

Please refer to FIG. 4. FIG. 4 is a diagram of the touch stylus 16 with the sonic detection set 32 according to a second embodiment of the present disclosure. The sonic detection set 32 (the pressure sensing unit 26) can include a sonic emitter 321, a sonic receiver 322, a compressive component 323 and a retractable isolation structure 324. The sonic emitter 321 and the sonic receiver 322 are respectively disposed on two ends of the retractable isolation structure 324, and the compressive component 32 is disposed inside the retractable isolation structure 324. A length of the retractable isolation structure 324 can be adjusted according to the movement of the tip 20 relative to the body 18, and the retractable isolation structure 324 can press the compressive component 323 as its length is adjusted. When the tip 20 moves relative to the body 18, a width of the compressive component 323 can be deformed by upper pressure and low pressure of the retractable isolation structure 324, so that the compressive component 323 can block a sonic wave path inside the retractable isolation structure 324. The retractable isolation structure 324 can prevent ambient sound from transmitting inward for isolating environmental interference.

For example, when the movement of the tip 20 relative to the body 18 is large, the compressive component 323 can be deformed widely to be flat, so as to effectively block the sonic wave path inside the retractable isolation structure 324, and the sonic receiver 322 receives a weak sound intensity signal. When the movement of the tip 20 relative to the body 18 is small, the compressive component 323 can be recovered to a slim shape. The sonic wave path inside the retractable isolation structure 324 is freely flowing, and the sonic receiver 322 can receive clear sound intensity signal. Parameters of the sound intensity signal from the sonic emitter 321 to the sonic receiver 322 can be varied according to deformation of the compressive component 323. The sonic detection set 32 can transform the sound intensity signal into the electrical signal corresponding to the movement, and the controller 28 can receive the electrical signal to drive the lighting unit 24 to emit the optical signal with the corresponding scintillating frequency, so that the optical detector 14 can transform the scintillating frequency of the optical signal into the pressure on the tip 20 by a specific algorithm.

Figure 5:
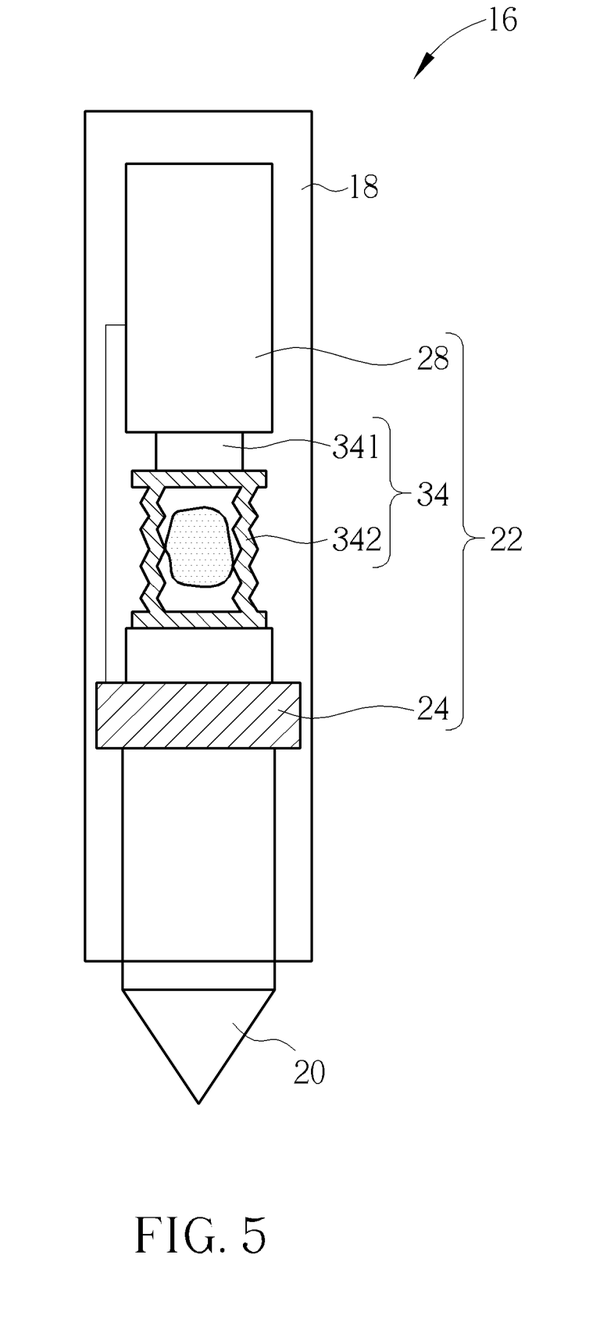
FIG. 5 is a diagram of the touch stylus with a medium pressure detection set according to a third embodiment of the present disclosure.

Please refer to FIG. 5. FIG. 5 is a diagram of the touch stylus 16 with the medium pressure detection set 34 according to a third embodiment of the present disclosure. The medium pressure detection set 34 (the pressure sensing unit 26) can include a manometer 341 and a retractable airtight structure 342. The manometer 341 is disposed by a side of the retractable airtight structure 342. Medium inside the retractable airtight structure 342 can be gas or liquid. When the tip 20 moves relative to the body 18, volume of the retractable airtight structure 342 is changed, and the manometer 341 can detect the pressure variation of the medium inside the retractable airtight structure 342. The medium pressure detection set 34 can effect medium pressure variation by compression of the volume of the retractable airtight structure 342, and then transform the medium pressure variation into the electrical signal corresponding to the movement. After, the controller 28 can receive the electrical signal to emit the optical signal with the corresponding scintillating frequency.

The pressure sensing unit 26 of the first embodiment, the second embodiment and the third embodiment of the present disclosure can respectively utilize an optical detection method, a sonic detection method, an atmosphere detection method and a hydraulic method to transform the detecting value into the electrical signal corresponding to the movement of the tip 20 relative to the body 18. The present disclosure can further utilize the controller 28 to read the electrical signal for emitting the optical signal with the corresponding scintillating frequency by the lighting unit 24, so that the optical detector 14 can immediately receive the optical signal for analyzing detailed parameter of the painting line. Therefore, the present disclosure can accurately detect the pressure on the tip 20 by the above-mentioned embodiments.

Generally, the optical signal emitted from the lighting unit 24 can be a visible optical signal or an invisible optical signal. As the lighting unit 24 outputs the visible optical signal, the user can view the scintillating frequency of the visible optical signal from the lighting unit 24 when utilizing the touch stylus 16, so the user can judge the applying force on the tip 20 to adjust the width of the painting line accordingly. In addition, the user does not view the scintillating frequency when the lighting unit 24 outputs the invisible optical signal, so as to prevent the user from confusion by twinkle is use of the touch stylus 16. The optical detection set 30 can utilize the invisible optical signal to avoid environmental light interference. Because the optical-mechanical system 10 may be positioned in a surrounding with ambient light, the lighting unit 24 transmits information via the invisible optical signal, and the optical detector 14 can be designed to be merely sensitive about the invisible optical signal, so as to prevent the ambient light interference. In the embodiment of the present disclosure, the lighting unit 24 can preferably be an infrared light emitting diode (the infrared LED).

An image capturing frequency of the optical detector 14 has its standard value. The image capturing frequency indicates that the optical detector 14 can capture how many frames per second, such as 20 FPS, 30 FPS or 60 FPS. The scintillating frequency of the lighting unit 24 can be substantially greater than the image capturing frequency of the optical detector 14. Therefore, the optical-mechanical system 10 of the present disclosure can uniformly divide the image capturing frequency of the optical detector 14 into a plurality of intervals (the plurality of period intervals), and determine the pressure on the tip 20 according to an amount of the frames from the lighting unit 24 during each interval.

For example, the image capturing frequency of the optical detector 14 can be 60 FPS, and the image capturing frequency is divided into three intervals that each interval is 20 FPS. When the user gradually presses the touch stylus 16 to paint the line on the panel 12, the scintillating frequency of the lighting unit 24 is increased progressively, so that an image capturing program of the optical detector 14 detects less frames during the first interval, the amount of the frames during the second interval is greater than the frames during the first interval, and the amount of the frames during the third interval is greater than the frames during the first interval and the second interval. The optical detector 14 can generate a pressure curve function according to the frame amount during each 20 FPS intervals, and can transform the pressure curve function into the pressure on the tip 20 by the specific algorithm, so as to display the line with relevant parameters, such as width variation, on the panel 12.

Furthermore, the optical-mechanical system 10 of the present disclosure can further utilize the scintillating frequency outputted from the touch stylus 16 to encode a trigger signal of shortcut button. An internal memory module of the optical-mechanical system 10 can store information of the shortcut button and the corresponding scintillating frequency. When using the touch stylus 16, the user can trigger the shortcut button by pressing the tip 20 rhythmically. For example, the scintillating frequency which is a combination of three long segments and three short segments can start a browser program of an operating system installed on the optical-mechanical system 10. The scintillating frequency which is a combination of two long segments and one short segment can start a media player program of the operating system. In the embodiment of the present disclosure, functions of code information or linear information modulated in the scintillating frequency of the lighting unit 24 can be set via software according to user demand. Because bandwidth of the optical signal can extend without limitation, the code information or the linear information modulated in the scintillating frequency of the optical signal can be abundant accordingly, and detailed description is omitted herein for simplicity.

In conclusion, the panel and the optical detector are utilized to detect the track of the line painted by the touch stylus, so that the optical-mechanical system of the present disclosure does not dispose the additional electronic component to be the receiver. The present disclosure can utilize the optical detector to simultaneously detect the pressure on the tip and the track of the line painted by the touch stylus, so as to drive the panel to display the line with corresponding width variation. The present disclosure can include the pressure sensing unit disposed inside the touch stylus for sensing the pressure on the tip, and can drive the lighting unit to emit the optical signal with the specific scintillating frequency according to the electrical signal generated by the actuated pressure sensing unit. Therefore, the optical detector of the present disclosure not only can detect the moving track of the touch stylus, but also can receive the parameter (the optical signal with the specific scintillating frequency) from the touch stylus, so as to transform the scintillating frequency into the pressure on the tip, and to display the line with different width variation on the panel according to the pressure on the tip.

Comparing to the prior art, the optical-mechanical system of the present disclosure can simultaneously detect the moving track of the touch stylus and the pressure on the tip, so as to display the line with the corresponding width variation on the panel. The optical-mechanical system transmits the value of the pressure on the tip via the scintillating frequency of the optical signal. The pressure on the tip corresponds to the width variation of the line painted on the panel. Besides, the scintillating frequency of the optical signal can include the code information or the linear information for triggering the shortcut button by specific clicks of the touch stylus. The present disclosure has advantages of simple structure and low assembly cost, and the touch stylus with the lighting unit can be applied to many kinds of the optical touch module for performing the painting line with the width variation, so that the product of the present disclosure has preferable market competition.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch stylus capable of detecting pressure on its tip, the touch stylus comprising:
    a body;
    a tip movably disposed on an end of the body; and
    a pressure sensing module disposed between the body and the tip for detecting the pressure on the tip, the pressure sensing module comprising:
        a lighting unit;
        a pressure sensing unit connected to the tip and comprising a signal emitter, a signal receiver and a retractable isolation structure, a press-based signal generated from the signal emitter being transmitted through the retractable isolation structure to be received by the signal receiver in a direction substantially parallel to a retracting direction of the retractable isolation structure, and a value of a movement between the tip and the body being acquired according to time difference between receiving the press-based signal by the signal receiver and outputting the press-based signal by the signal emitter, so as to generate a corresponding electrical signal; and
        a controller electrically connected to the lighting unit and the pressure sensing unit for receiving the electrical signal, so as to drive the lighting unit to generate a corresponding optical signal, a scintillating frequency of the optical signal and a value of the electrical signal being in direct proportion, and the controller being adapted to activate the lighting unit by the electrical signal varied with the compressed variation of the retractable isolation structure since the pressure sensing unit detects the movement of the tip and further to accordingly increase the scintillating frequency since the movement is increased;
        wherein the optical signal is transmitted to an optical detector disposed on a panel, and the optical detector transforms the scintillating frequency of the optical signal into the pressure on the tip.

2. The touch stylus of claim 1, wherein the lighting unit is an infrared light emitting diode.

3. The touch stylus of claim 1, wherein the pressure sensing unit is an optical detection set, the optical detection set comprises an optical emitter, an optical receiver and the retractable isolation structure.

4. The touch stylus of claim 3, wherein the optical emitter and the optical receiver are respectively disposed on two ends of the retractable isolation structure.

5. The touch stylus of claim 3, wherein the optical receiver receives a light intensity signal emitted from the optical emitter, and transforms the light intensity signal into the electrical signal corresponding to the movement.

6. The touch stylus of claim 1, wherein the pressure sensing unit is a sonic detection set, the sonic detection set comprises a sonic emitter, a sonic receiver, a compressive component and the retractable isolation structure, the sonic emitter and the sonic receiver are respectively disposed on two ends of the retractable isolation structure, the compressive component is disposed inside the retractable isolation structure, the sonic receiver receives a sound intensity signal emitted from the sonic emitter, and transforms the sound intensity signal into the electrical signal corresponding to the movement.

7. The touch stylus of claim 1, wherein the scintillating frequency of the optical signal and the pressure on the tip are in direct proportion.

8. An optical-mechanical system utilizing a touch stylus to detect pressure on its tip, the optical-mechanical system comprising:
    a panel;
    at least one optical detector disposed on a corner of the panel, and
    a touch stylus for painting a line on the panel, the optical detector detecting parameters generated by the touch stylus to display a pattern on the panel, the pattern corresponding to a track of the line and the pressure on its tip, the touch stylus comprising:
        a body;
        a tip movably disposed on an end of the body; and
        a pressure sensing module disposed between the body and the tip for detecting the pressure on the tip, the pressure sensing module comprising:
            a lighting unit;
            a pressure sensing unit connected to the tip and comprising a signal emitter, a signal receiver and a retractable isolation structure, a press-based signal generated from the signal emitter being transmitted through the retractable isolation structure to be received by the signal receiver in a direction substantially parallel to a retracting direction of the retractable isolation structure, and a value of a movement between the tip and the body being acquired according to time difference between receiving the press-based signal by the signal receiver and outputting the press-based signal by the signal emitter, so as to generate a corresponding electrical signal; and
            a controller electrically connected to the lighting unit and the pressure sensing unit for receiving the electrical signal, so as to drive the lighting unit to generate a corresponding optical signal, a scintillating frequency of the optical signal and a value of the electrical signal being in direct proportion, and the controller being adapted to activate the lighting unit by the electrical signal varied with the compressed variation of the retractable isolation structure since the pressure sensing unit detects the movement of the tip and further to accordingly increase the scintillating frequency since the movement is increased;
            wherein the optical detector receives the optical signal, and transforms the scintillating frequency of the optical signal into the pressure on the tip.

9. The optical-mechanical system of claim 8, wherein the lighting unit is an infrared light emitting diode.

10. The optical-mechanical system of claim 8, wherein the pressure sensing unit is an optical detection set, the optical detection set comprises an optical emitter, an optical receiver and the retractable isolation structure, the optical emitter and the optical receiver are respectively disposed on two ends of the retractable isolation structure, the optical receiver receives a light intensity signal emitted from the optical emitter, and transforms the light intensity signal into the electrical signal corresponding to the movement.

11. The optical-mechanical system of claim 8, wherein the pressure sensing unit is a sonic detection set, the sonic detection set comprises a sonic emitter, a sonic receiver, a compressive component and the retractable isolation structure, the sonic emitter and the sonic receiver are respectively disposed on two ends of the retractable isolation structure, the compressive component is disposed inside the retractable isolation structure, the sonic receiver receives a sound intensity signal emitted from the sonic emitter, and transforms the sound intensity signal into the electrical signal corresponding to the movement.

12. The optical-mechanical system of claim 8, wherein the optical detector further analyzes code information or linear information modulated in the scintillating frequency of the optical signal.

13. The optical-mechanical system of claim 8, wherein an image capturing frequency of the optical detector is divided into a plurality of intervals, the optical detector reads the scintillating frequency of the optical signal during each frequency interval in sequence, and transforms the scintillating frequency of the optical signal into the pressure on the tip.

14. The optical-mechanical system of claim 8, wherein the scintillating frequency of the optical signal and the pressure on the tip are in direct proportion.

* * * * *